United States Patent
Ruohonen et al.

(10) Patent No.: US 6,834,184 B2
(45) Date of Patent: Dec. 21, 2004

(54) METHOD FOR SUPPLYING REFERENCE DATA FOR A FREQUENCY UPDATE IN A MOBILE STATION, MOBILE STATION, MODULE OF A MOBILE STATION AND RADIO COMMUNICATIONS SYSTEM

(75) Inventors: Jari Ruohonen, Tampere (FI); Nils Degn, Frederiksberg (DK); Timo Harkala, Tampere (FI); Jarkko Oksala, Tampere (FI)

(73) Assignee: Nokia Corporation, Espoo (FI)

( * ) Notice: Subject to any disclaimer, the term of this patent is extended or adjusted under 35 U.S.C. 154(b) by 477 days.

(21) Appl. No.: 10/083,765

(22) Filed: Feb. 25, 2002

(65) Prior Publication Data

US 2002/0151286 A1 Oct. 17, 2002

(30) Foreign Application Priority Data

Feb. 28, 2001 (EP) ............................................ 01104879

(51) Int. Cl.⁷ ................................................ H04B 1/18
(52) U.S. Cl. ..................... 455/182.2; 455/43; 455/67.13
(58) Field of Search ........................... 455/182.2, 414.1, 455/43, 501, 513, 63.1, 63.2, 67.11, 67.13, 95, 575.1, 113, 115.3, 136, 150.1, 179.1, 182.1; 342/383, 367, 361, 378; 375/228, 224, 325, 326, 340

(56) References Cited

U.S. PATENT DOCUMENTS

| | | | | |
|---|---|---|---|---|
| 5,309,439 A | | 5/1994 | Roos ........................ 370/104.1 |
| 5,561,673 A | * | 10/1996 | Takai et al. .................. 714/708 |
| 5,825,817 A | * | 10/1998 | Tanaka et al. ............... 375/228 |
| 5,918,204 A | * | 6/1999 | Tsurumaru ................... 704/214 |
| 6,504,506 B1 | * | 1/2003 | Thomas et al. ............. 342/383 |

FOREIGN PATENT DOCUMENTS

WO    WO 99/09673    2/1999

OTHER PUBLICATIONS

"Digital Cellular Telecommunications System (Phase 2+); General Packet Radio Service (GPRS); Overall description of the GPRS radio interface; Stage 2; (GSM 03.64 version 7.0.0 Release 1998)", ETSI TS 101 350 , (Jul. 1999).
GSM Technical Specification, GSM 05.10, 1996, Version 5.0.0., Digital Cellular Telecommunications System (Phase 2+); Radio Subsystem Synchronisation (GSM 05.10).

\* cited by examiner

*Primary Examiner*—Tony T. Nguyen
(74) *Attorney, Agent, or Firm*—Perman & Green, LLP

(57) ABSTRACT

The invention relates to a method for supplying reference data that is to be used in a mobile station of a radio communications network for a frequency update of the frequency used by the mobile station, which reference data is based on bursts received by the mobile station from a base station of said radio communications system. In order to allow for an improved supply of reference data to an automatic frequency correction algorithm, it is proposed that the method comprises determining the signal-to-noise-ratio of all bursts received unless they were discarded by some selection process; and providing at least some of the bursts for which a signal-to-noise-ratio greater than a predetermined value was determined as basis for the reference data to be used for the frequency update. The invention equally relates to a mobile station, a module and a radio communications system comprising the corresponding means.

15 Claims, 1 Drawing Sheet

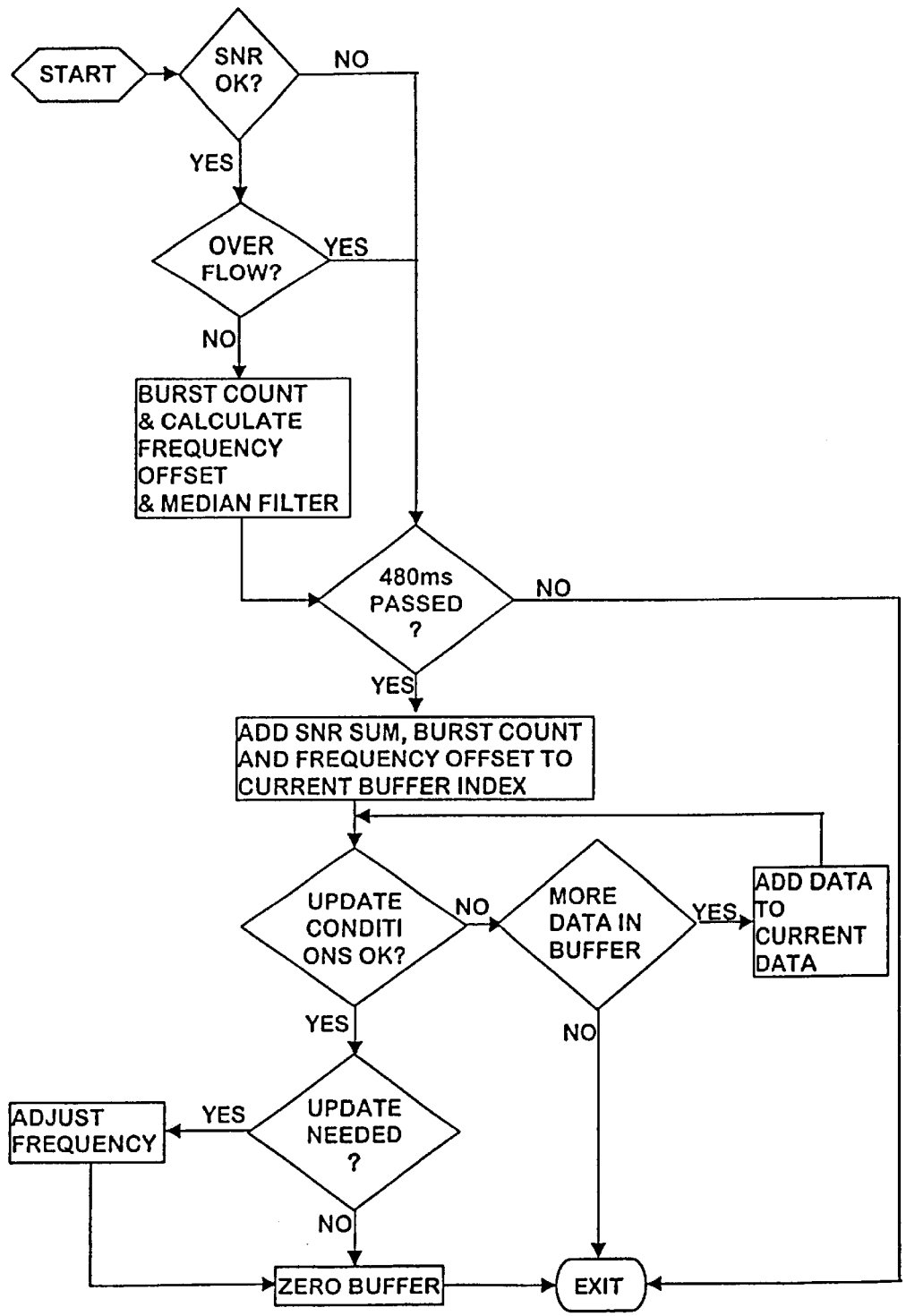

METHOD FOR SUPPLYING REFERENCE DATA FOR A FREQUENCY UPDATE IN A MOBILE STATION, MOBILE STATION, MODULE OF A MOBILE STATION AND RADIO COMMUNICATIONS SYSTEM

FIELD OF THE INVENTION

The invention relates to a method for providing reference data that is to be used in a mobile station of a radio communications network for a frequency update of the frequency used by the mobile station, which reference data is based on bursts received by the mobile station from a base station of said radio communications system. The invention equally relates to such a mobile station, a module for such a mobile station and a radio communications system.

BACKGROUND OF THE INVENTION

In radio communication systems, certain characteristics of the wireless reception environment are unpredictable. For example, when the location of a mobile station is changed from the inside to the outside of a building during a phone call or a packet transmission, the frequency can change on account of a difference in temperature. Resulting errors on the transmission path might lead in the worst case to a disconnection of the phone call or the packet transmission. Therefore, a mobile station has to track certain characteristics of the received signal in order to be able to decode the information from the signal correctly and to be able to transmit an uplink signal that can be decoded correctly by the network.

It is known to provide mobile stations with so called Automatic Frequency Correction AFC capabilities. The purpose of the automatic frequency correction is to track changes in the frequency of the received signal and to cause a corresponding change in the frequency used by the mobile station.

For GSM (global system of mobile communication), the synchronisation of mobile stations with a base station has to be conform with the standardisation by the European Telecommunications Standards Institute described in "Digital cellular telecommunications system (Phase 2+); Radio subsystem synchronisation", GSM 05.10, Version 5.0.0, May 1996.

According to this standard, the base station sends signals on the broadcast control channel (BCCH) to enable the mobile station to synchronise itself to the base station and if necessary correct its frequency standard to be in line with that of the base station. The timings of timeslots, time division multiple access (TDMA) frames, traffic channel (TCH) frames and control channel frames are all related to a common set of counters which run continuously whether the mobile station and base station are transmitting or not. Thus, once the mobile station has determined the correct setting of these counters, all its processes are synchronised to the current serving base station. The mobile station times its transmissions to the base station in line with those received from the base station. The base station sends to each mobile station a "timing advance" parameter according to the perceived round trip propagation delay base station— mobile station—base station. The mobile station advances its timing by this amount, with the result that signals from different mobile stations arriving at the base station are compensated for propagation delay. This process is called "adaptive frame alignment".

After synchronisation, the frequency used by the mobile station is continuously updated in order to ensure that it corresponds to the frequency used by the base station. The frequency used by the base station can be determined in the mobile station e.g. by determining the phase difference between two samples of a received burst/block in the digital plane, since there is a direct correspondence between this phase difference and the used frequency. In every used burst/block, an average is done over a certain number of pairs of samples. To get a more accurate estimate, additionally an average over a number of bursts is carried out, while only bursts/blocks that have a good signal-to-noise ratio are used. Depending on the mode, the used bursts/blocks and the average count changes. For example, when receiving system parameters the first time after synchronisation, faster adaptation may work better compared to the operation in traffic channel. An adequate implementation for AFC in TCH could use only slow associated control channel (SACCH) and silent descriptor (SID) frames as basis for reference data for an automatic frequency correction. In SACCH and SID, there is always transmission. The mobile station knows from the frame number when these frames occur, and thus an algorithm using the bursts in those frames can be implemented. As an example, if the averaging count in this case was set to 32 frames, that would result for TCH in an average frequency update time of 1.28 seconds.

In contrast to GSM, in GPRS (General Packet Radio Systems), which is transmitting in packet data traffic channels (PDTCH), there are no SID or SACCH frames ensuring that there is always a downlink transmission. The network is only responsible to provide at least one block containing four bursts every 18 block period for the mobile to be used for automatic frequency correction and other characteristics to be tracked. If these required reference transmission are used for automatic frequency correction, less bursts are available for automatic frequency correction than the minimum number required in GSM. Since the ETSI specification requirements are therefore stricter for the GPRS than for GSM in the sense that in the worst case situation there is less downlink transmission to be used as a reference for automatic frequency correction on GPRS PDTCH, the present possibilities for GPRS automatic frequency correction are not satisfying.

SUMMARY OF THE INVENTION

It is an object of the invention to provide a method, a mobile station, a module for a mobile station and a radio communications system allowing for an improved supply of reference data for a frequency update of the frequency used in a mobile station.

This object is reached on the one hand with a method for providing reference data that is to be used in a mobile station of a radio communications network for a frequency update of the frequency used by the mobile station, which reference data is based on bursts received by the mobile station from a base station of said radio communications system, comprising:

considering all bursts received by the mobile station from the base station as possible basis for the reference data;

determining the signal-to-noise-ratio of at least some of the bursts considered; and supplying at least some of the bursts for which a signal-to-noise-ratio greater than a predetermined value was determined as basis for the reference data to be used for the frequency update.

On the other hand, the object is reached with a corresponding mobile station mobile station for a radio communications system comprising means for updating the frequency used by the mobile station using reference data based on bursts received by the mobile station from a base station of said radio communications system; and means for considering all bursts received from the base station as possible basis for the reference data, for determining the signal-to-noise-ratio of at least some of the bursts received and for supplying at least some of the bursts for which a signal-to-noise-ratio greater than a predetermined value was determined as basis for the reference data to be used by the means for updating the frequency.

The object is further reached with a module for a mobile station comprising such means for providing reference data to means for updating the frequency used by a mobile station.

Finally, the object is reached with a radio communications system comprising such a mobile station.

The invention proceeds from the idea that all bursts received by a mobile station from a base station can be used as reference data in an accordingly designed automatic frequency correction algorithm used for an update of the frequency presently employed by the mobile station. In order to ensure the quality of the reference data, first the signal-to-noise-ratio is determined in the mobile station for the bursts received from the base station. Each determined signal-to-noise-ratio is compared to a predetermined value. Only the bursts for which a signal-to-noise-ratio was determined that exceeds the predetermined value are supplied as basis for the reference data needed for a frequency update. Since all received bursts are taken into account as possible basis for reference data, the invention enables a supply of sufficient and reliable reference data that can be used for a frequency update of the frequency employed by a mobile station. Obviously, in a frequency update the frequency used by the mobile station only has to be changed or set anew in case the reference data indicates that a change is necessary.

According to the invention, the signal-to-noise ratio is determined for all received bursts, except if another suitable selection process is carried out on all received bursts before the determination of the signal-to-noise ratio. Such a selection process may discards some of the bursts, because they are not suited for the frequency update. An additional selection step may also be arranged after bursts were selected for the frequency update according to the signal-to-noise ratio.

Preferred embodiments of the invention become apparent from the subclaims.

Advantageously, at least a part of the reference data used for a frequency update is provided in the form of a frequency offset which the frequency used by the mobile station is estimated to have compared to the frequency used by the base station. To this end, a frequency offset is determined between the frequency presently used by the mobile station and the frequency used by the base station as indicated by received bursts is determined on the basis of each burst for which a signal-to-noise-ratio greater than a predetermined value was determined. In a preferred embodiment of the invention, an additional selection process is applied for a further improvement of the quality of such frequency offsets that are eventually used for a frequency update. In case the channel estimates of received bursts are poor or if the noise in the received bursts is large, some of the frequency offsets will differ significantly from the mean of the determined frequency offsets. Since these offsets have no or little actual information on the current frequency offset, they are removed. Preferably, this is achieved with some kind of filter which filters all frequency offsets obtained. A running median filter of any length, e.g. of length three, would be particularly suited for this purpose, but other filters, like an average filter, can be employed just the same.

In GPRS the number of useful bursts may vary significantly. In particular, when the network is transmitting only the reference transmission, there are less bursts per time period for GPRS automatic frequency correction compared to GSM automatic frequency correction. Therefore, in a further preferred embodiment of the invention, reference data resulting from suited bursts is preferably stored in the mobile station in order to accumulate enough reference data for the frequency update, the mobile station using at least as much of the most recent reference data for the frequency update as is necessary for the update. In particular, reference data can be stored for a plurality of predetermined time periods. Then, reference data resulting from bursts of previous time periods can be used to supplement information resulting from bursts received in the most recent time period. Thus, sufficient information is obtained for a frequency update in an automatic frequency correction. Advantageously, on the one hand only the most recent data is used, whenever the number of useful bursts in a most recent predetermined time period is large enough, i.e. in particular during an active downlink transmission. On the other hand, stored data of previous time periods is used in addition to the data of the most recent time period in order to improve the frequency offset estimation, whenever there are not enough usable bursts received in the most recent predetermined time period for carrying out the automatic frequency correction.

An algorithm based on such an approach is designed to operated optimally with varying reference data rates, which are typical for GPRS operation. For instance, when there is data transmission ongoing and abundant reference data is available, the algorithm adapts to changes in frequency faster than in the example of GSM AFC. Using only the most recent data gives also the best estimate of the situation where only the reference transmission is sent by expanding the reference data collection period, which then becomes longer than in the example of GSM AFC.

Preferably, the data of previous time periods is stored in a buffer. The buffer can have e.g. a length corresponding to n predetermined time periods of m seconds, i.e. a total lengths corresponding to n×m seconds. n should be an integer, but m can be any suitable real number. The total length of the buffer in time and the number of slots in the buffer can be constants. The information in the buffer is used in a way that first it is checked whether there is enough data from the most recent time period of m seconds for carrying out the automatic frequency correction. If there is not enough data, data from the preceding time period of m seconds is read from the buffer and added to the data for automatic frequency correction, and a new check is carried out. This is continued with data of further preceding time periods of m seconds, until there is enough data to carry out an automatic frequency correction or until the end of the buffer is reached. The data stored in the buffer for n time periods of m seconds consists advantageously in the summed signal-to-noise-ratios from useful bursts for each time period, the number of useful bursts and the average of calculated frequency offsets in useful bursts of one time period. Advantageously, the buffer is cleared after each frequency update, including the updates in which the frequency did not have to be changed.

In principle, all bursts received from a base station can be used according to the invention for automatic frequency correction, if only the determined signal-to-noise-ratio is greater than a predetermined value. The bursts used as basis for the reference data for the frequency update may be further pre-selected, though.

Analogue bursts received by a mobile station from a base station are converted in the mobile station into digital bursts by an analogue-to-digital converter (ADC). Only these digital bursts are used for determining the signal-to-noise-ratio of the particular burst. On some occasions, e.g. when the a GPRS mobile station is receiving on PDTCH, it is possible that the base station starts to transmit blocks to another mobile station with a power that is at maximum 30 dB higher than the power used in blocks meant for the first mobile station. In this case, the signal may overflow in the analogue-to-digital conversion window and therefore not be suited to be used for the automatic frequency correction algorithm, even though the signal-to-noise-ratio might be determined to exceed the predetermined value. In order to avoid the use of incorrect reference data in the automatic frequency correction algorithm, it is therefore proposed to discard bursts which resulted in an overflow in the analogue-to-digital conversion, either before or after the signal-to-noise-ratio has been determined for the burst. In order to be able to detect an overflow, it can be checked whether the RSSI (received signal strength indicator) of a burst after analogue-to-digital conversion exceeds a predetermined threshold value.

Alternatively to checking if the signals have overflown during analogue-to-digital conversion, it would also be possible to check whether a received burst was transmitted with a power level above a predetermined level, e.g. 20 dB higher than the maximum power level intended for the mobile station.

The functions proposed for the method, the mobile station and the module of the invention can be realised as DSP SW (digital signal processor software) implementations.

An advantageous employment of the method, the mobile station and the module according to the invention is to be seen in particular, though not exclusively, with GPRS (General Packet Radio Systems).

BRIEF DESCRIPTION OF THE FIGURES

In the following, the invention is explained in more detail with reference to a drawing. The only FIGURE shows a flow chart illustrating the method of the invention.

DETAILED DESCRIPTION OF THE INVENTION

The only FIGURE shows a flowchart of an AFC-algorithm implemented in a mobile station according to the invention. The AFC-algorithm is used for GPRS and is based on the method according to the invention. The embodiment of the GPRS specific AFC in the flowchart makes use of bursts received on a PDTCH from a base station. Between a start symbol and an exit symbol of the flowchart, each rhombus indicates a decision and each rectangle an action taken in the algorithm.

All analogue bursts received at the mobile station from a base station on a PDTCH are first converted in the mobile station into digital bursts by analogue-to-digital conversion. These digital bursts are then processed in the algorithm depicted in the FIGURE.

For each burst, the SNR is determined. More specifically, a burst is represented after analogue-to-digital conversion in DSP in the complex IQ (In-phase/Quadrature) space, each bit consisting of an I and a Q sample value. If the samples related to bit values 1/0 are near each other, then this means that the noise has been small and SNR is big. At the same time, the variance and the standard deviation of the I and Q values are small. These qualifiers have therefore a connection between each other that can be used to estimate the SNR. If the SNR is below a predetermined value, the burst is discarded and as next step it is determined whether 480 ms have passed after the last update of the frequency used by the mobile station.

If the SNR of the burst was determined to be sufficient, it is checked, whether the burst resulted in an overflow during analogue-to-digital conversion. If an overflow is detected, the burst is discarded and as a next step it is determined whether 480 ms have passed after the last update of the frequency used by the mobile station.

If no overflow occurred during analogue-to-digital conversion, the present burst constitutes a burst useful as reference data for the AFC. In this case, a burst counter is incremented, and the frequency offset between the frequency presently used by the mobile station and the frequency used by the base station is determined based on the burst. More specifically, a frequency offset estimate can be calculated by determining the phase difference between a certain amount of IQ samples from the start and from the end of the burst. Before the frequency offsets are finally provided as basis for correcting the frequency used by the mobile station, the frequency offsets are submitted to a running median filter of length three, i.e. using additionally the last two determined frequency offsets. This filter removes poor frequency offset values. Since the used median filter only has a length of three, it can remove poor offsets only, if they are separated by more than two samples.

Like after discarding of bursts because of low SNR or because of ADC overflow, as a next step it is determined whether 480 ms have passed after the last update of the frequency used by the mobile station. In GPRS, the minimum frequency update time is chosen to be 480 ms. Therefore, only after each period of 480 ms it is checked whether a frequency update can be made based on the available reference data. The time window of 480 ms corresponds to the length of 104 TDMA frames of a 104 multiframe. The algorithm presented in the flowchart is stopped, in case 480 ms have not passed after the previous update. Then, the algorithm is started anew for the next burst received from the base station, in order to accumulate additional reference data for the present 480 ms time period.

In case 480 ms have passed, the sum of the determined SNR of all bursts used for frequency estimation in this 480 ms period since the last frequency update, the corresponding burst count and the corresponding determined frequency offsets are added to the current buffer index. Afterwards, it is checked whether the conditions are reached for performing an update if needed. As criteria whether the conditions are reached, it is checked whether the number of received useful bursts indicated by the burst count is greater than a predetermined number. In addition it is checked whether the SNR sum of all useful received bursts is greater than a predetermined value.

If the conditions are not reached, it is determined whether there is data in the buffer from the preceding 480 ms period. If this is the case, the data from the previous 480 ms is added to the current data, and the conditions are checked again. This is repeated for further preceding 480 ms periods, until either the conditions are met or until there is no more data of preceding 480 ms periods present in the buffer. Each 480 ms period of which the data might be added is identified by a buffer index 0–3 assigned to the respective time period, the corresponding value of a counter starting from 0 and being incremented for each additional 480 ms period taken into account. The buffer can store a maximum of 1.92 seconds of past information, which corresponds to 4×104 TDMA frames. In case that the conditions were not met and no more past information is available, the algorithm is stopped and started anew with the next burst. The oldest data in the buffer is then overwritten with the new data for the next 480 ms period.

If the conditions are met with the data of the current 480 ms period or after having added data of one or more preceding 480 ms periods, it is determined based on this data whether a frequency update is needed. In case the frequency used by the mobile station has to be corrected, the frequency is adjusted accordingly. In case a frequency update was possible, regardless of an adjustment carried out, the buffer is emptied. Then, the algorithm is stopped and started anew with the next burst.

What is claimed is:

1. Method for providing reference data that is to be used in a mobile station of a radio communications network for a frequency update of the frequency used by the mobile station, which reference data is based on bursts received by the mobile station from a base station of said radio communications system, comprising:

considering all bursts received by the mobile station from the base station as possible basis for the reference data;

determining the signal-to-noise-ratio of at least some of the bursts considered; and supplying at least some of the bursts for which a signal-to-noise-ratio greater than a predetermined value was determined as basis for the reference data to be used for the frequency update.

2. Method according to claim 1, wherein a frequency offset between the frequency presently used by the mobile station and the frequency used by the base station as indicated by received bursts is determined from each burst for which a signal-to-noise-ratio greater than a predetermined value was determined, which frequency offset is to be used as part of the reference data for the frequency update of the frequency used by the mobile station, further comprising removing determined frequency offsets based on received bursts with poor channel estimates or large noise.

3. Method according to claim 2, wherein the frequency offsets based on received bursts with poor channel estimates or large noise are removed by filtering all frequency offsets obtained.

4. Method according to claim 1, further comprising storing reference data in the mobile station, the mobile station using at least as much of the most recent reference data for a frequency update as is necessary for the update.

5. Method according to claim 4, wherein reference data is stored for a maximum of n×m seconds, wherein n is an integer and m any real number, further comprising checking every m seconds whether sufficient reference data is present for a frequency update, the mobile station using the stored reference data of as many most recent time periods of m seconds as are necessary for obtaining sufficient reference data for the frequency update.

6. Method according to claim 1, wherein the signal-to-noise-ratio of the bursts received from the base station is determined after an analogue-to-digital conversion of all received bursts, further comprising detecting in the mobile station all bursts that resulted in an overflow in analogue-to-digital conversion; and preventing all bursts for which an overflow was detected from being provided as basis for the reference data to be used for the frequency update.

7. Mobile station for a radio communications system comprising means for updating the frequency used by the mobile station using reference data based on bursts received by the mobile station from a base station of said radio communications system; and means for considering all bursts received from the base station as possible basis for the reference data, for determining the signal-to-noise-ratio of at least some of the bursts received and for supplying at least some of the bursts for which a signal-to-noise-ratio greater than a predetermined value was determined as basis for the reference data to be used by the means for updating the frequency.

8. Mobile station according to claim 7, further comprising means for determining from each burst for which a signal-to-noise-ratio greater than a predetermined value was determined a frequency offset between the frequency presently used by the mobile station and the frequency used by the base station as indicated by received bursts, and means for removing determined frequency offsets that are based on received bursts with poor channel estimates or large noise, wherein the remaining frequency offsets are used as part of the reference data supplied to the means for updating the frequency.

9. Method according to claim 8, wherein the means for removing frequency offsets comprise a filter.

10. Mobile station according to claim 7, further comprising means for storing reference data, said means for storing being suited for supplying to the means for updating the frequency for each update at least as much of the most recently stored reference data as is necessary for an update.

11. Mobile station according to claim 10, wherein the means for storing reference data are suited for storing reference data for n×m seconds, wherein n is an integer and m any real number, for checking every m seconds whether sufficient stored reference data is present for a frequency update, and for forwarding to the means for updating the frequency the stored reference data of as many most recent time periods of m seconds as are necessary for obtaining sufficient reference data for the frequency update.

12. Mobile station according to claim 7, wherein the means for determining the signal-to-noise-ratio of bursts receive the respective bursts via an analogue-to-digital converter converting analogue bursts received from the base station into digital bursts, further comprising means for detecting bursts that resulted in an overflow in analogue-to-digital conversion and for preventing all bursts for which an overflow was detected from being provided as basis for the reference data to be used by the means for updating the frequency.

13. The method according to claim 1 for use in a general packet radio system.

14. Module for a mobile station of a radio communications system comprising means for providing reference data to means for updating the frequency used by a mobile station according to claim 7.

15. Radio communications system comprising at least one mobile station according to claim 7.

* * * * *